United States Patent
Ueno et al.

(10) Patent No.: US 9,902,029 B2
(45) Date of Patent: Feb. 27, 2018

(54) NUT RUNNER WITH CORE RUNOUT PREVENTING MECHANISM

(71) Applicant: FANUC CORPORATION, Yamanashi (JP)

(72) Inventors: Takanobu Ueno, Yamanashi (JP); Yoshihide Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 262 days.

(21) Appl. No.: 14/714,832

(22) Filed: May 18, 2015

(65) Prior Publication Data

US 2015/0343579 A1 Dec. 3, 2015

(30) Foreign Application Priority Data

May 30, 2014 (JP) .................................. 2014-112548

(51) Int. Cl.
B25J 15/00 (2006.01)
B23P 19/06 (2006.01)

(52) U.S. Cl.
CPC ................ *B23P 19/06* (2013.01); *B25J 15/00* (2013.01)

(58) Field of Classification Search
CPC ........... B23P 19/06; B25B 21/00; B25J 15/08; B23Q 1/25; B23Q 1/40
USPC .......... 81/57.42, 57.4, 57.34, 57.35, 54, 467
See application file for complete search history.

(56) References Cited

U.S. PATENT DOCUMENTS

| | | | | | |
|---|---|---|---|---|---|
| 3,334,671 | A | * | 8/1967 | Agostini | B25B 21/00 81/455 |
| 3,759,334 | A | * | 9/1973 | Theurer | E01B 29/28 104/17.1 |
| 5,123,309 | A | * | 6/1992 | Moceri | B23P 19/06 81/177.2 |
| 5,277,085 | A | * | 1/1994 | Tanimura | B23P 19/069 81/57.14 |
| 2005/0247166 | A1 | * | 11/2005 | Sasaki | B23P 19/06 81/54 |
| 2007/0180956 | A1 | * | 8/2007 | Noguchi | B23P 19/06 81/54 |
| 2011/0245052 | A1 | * | 10/2011 | Ohno | B23P 19/06 483/18 |
| 2014/0125080 | A1 | * | 5/2014 | Dan | B25J 15/0019 294/213 |

FOREIGN PATENT DOCUMENTS

| | | | | |
|---|---|---|---|---|
| JP | 63034031 A | * | 2/1988 | .............. B23P 19/06 |
| JP | 06-36728 U | | 5/1994 | |
| JP | 6-36727 U | | 6/1994 | |
| WO | 2013/005330 A1 | | 1/2013 | |

* cited by examiner

*Primary Examiner* — Joseph J Hail
*Assistant Examiner* — J Stephen Taylor
(74) *Attorney, Agent, or Firm* — Hauptman Ham, LLP

(57) ABSTRACT

A nut runner which comprises a socket holder attached to a tip end of an output shaft, a slide mechanism unit for extending and retracting the output shaft in the axial direction, a pushing unit for pushing the output shaft toward the tip end side in the axial direction, during a screw tightening operation, in cooperation with the slide mechanism unit, and a supporting unit for supporting a socket retained by the socket holder while allowing a nut runner driving unit to rotate and axially move the socket.

5 Claims, 3 Drawing Sheets

NUT RUNNER WITH CORE RUNOUT PREVENTING MECHANISM

RELATED APPLICATIONS

The present application claims priority of Japanese Application Number 2014-112548, filed May 30, 2014, the disclosure of which is hereby incorporated by reference herein in its entirety.

BACKGROUND OF THE INVENTION

1. Technical Field

The present invention relates to a nut runner having, on its tip end, a socket holder for retaining a socket.

2. Description of the Related Art

A nut runner has, on its tip end, a socket holder for retaining a socket. The socket holder retains a socket having dimensions which are different depending on the dimensions of a nut, bolt, or screw to be fastened or loosened. The socket retained by the socket holder fastens or loosens, for example, a nut.

There is a clearance between the socket and the socket holder of the nut runner, which typically causes a backlash, when the nut runner rotates, because the socket is relatively long. Japanese Unexamined Utility Model Publication (U. M. Kokai) No. 6-36728 discloses that a bearing provided on the inner surface of a socket holder prevents a backlash.

However, in U. M. Kokai No. 6-36728, a clearance still remains between a socket and a socket holder. This may cause the socket to incline, due to its weight, with respect to the center axis of a nut runner when the nut runner is used horizontally. Thus, the axis of the nut runner tends to deviate greatly, and positioning of the socket is difficult.

In view of these problems, it is an object of the present invention to provide a nut runner in which a core runout is prevented and a socket can be easily positioned even when the nut runner is used horizontally.

SUMMARY OF INVENTION

To achieve the above object, a first aspect of the present invention provides a nut runner comprising a socket holder attached to a tip end of an output shaft, a slide mechanism unit for extending and retracting the output shaft in the axial direction, a pushing unit for pushing the output shaft toward the tip end side in the axial direction, during a screw tightening operation, in cooperation with the slide mechanism unit, and a supporting unit for supporting a socket retained by the socket holder while allowing a nut runner driving unit to rotate and axially move the socket.

A second aspect of the present invention provides the nut runner according to the first aspect, wherein the supporting unit comprises two opening and closing claws opposed to each other and ball rollers rotatably attached to the respective claws.

A third aspect of the present invention provides the nut runner according to the second aspect, wherein a cross section of each claw, taken along the line perpendicular to the center axis of the nut runner, has a substantially V-shaped portion.

These and other objects, features, and advantages of the present invention will become more apparent from the detailed description of typical embodiments of the present invention which are shown in the attached drawings.

DETAILED DESCRIPTION

Figure 1:
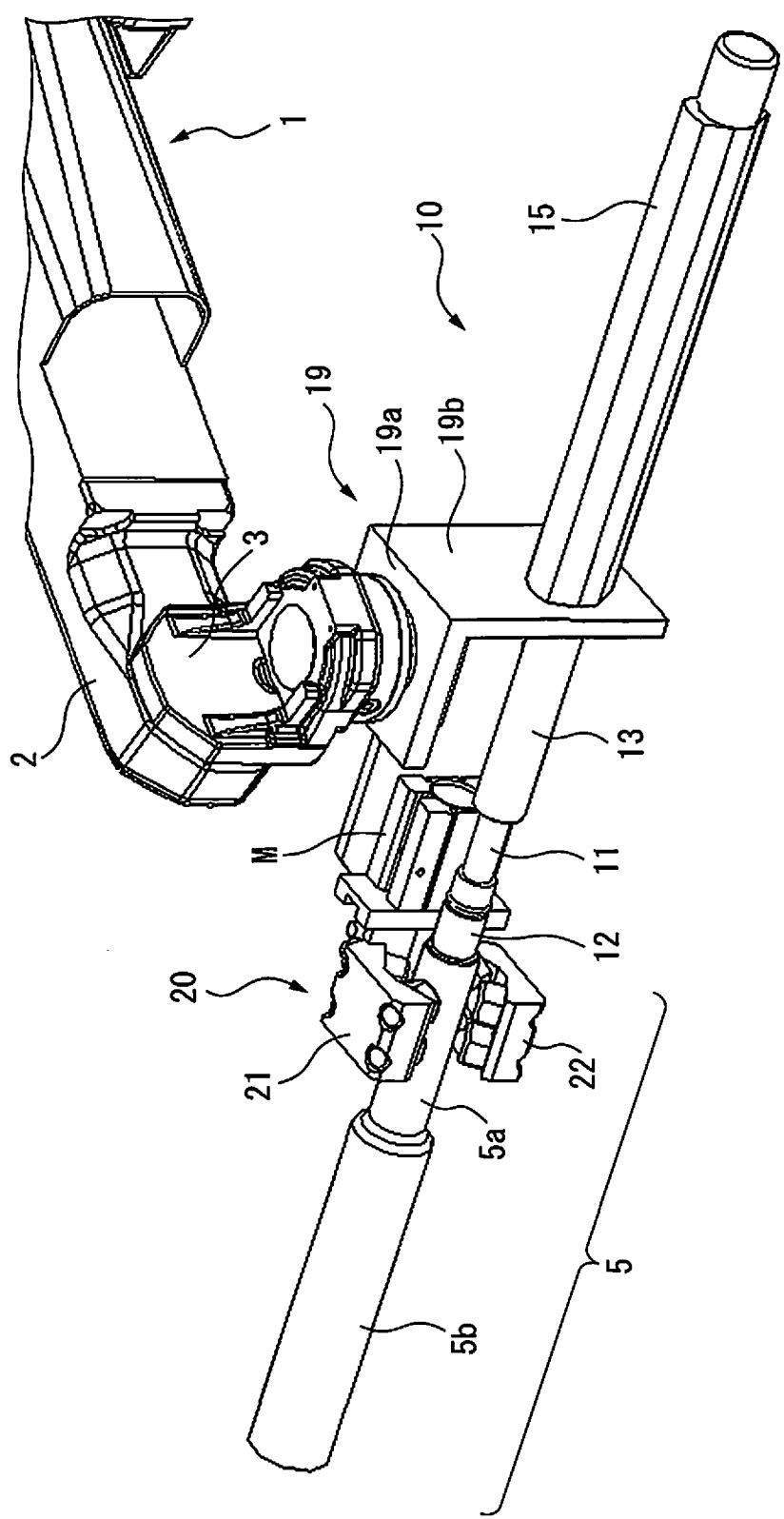
FIG. 1 is a perspective view of a nut runner according to the present invention.

Embodiments of the present invention will be described below with reference to the accompanying drawings. In the following figures, similar members are designated with similar reference numerals. To facilitate understanding, these figures have been suitably changed in scale.

FIG. 1 is a perspective view of a nut runner according to the present invention. In FIG. 1, a tip end 3 of an arm 2 of a robot 1 is attached to a first side 19a of a bracket 19 of a nut runner 10. The robot 1 is, for example, a six-axial articulated robot, but may be another type of robot. The nut runner 10 may be secured to another automatic machine or device.

As shown in FIG. 1, a nut runner driving unit 15 of the nut runner 10 is attached, in the vicinity of its tip end, to a second side 19b of the bracket 19. The nut runner 10 mainly comprises the nut runner driving unit 15 and an output shaft 11 engaged with a rod 18 (which will be described later) engaged in the nut runner driving unit 15. The output shaft 11 is moved in the axial direction by a slide mechanism unit 13. The output shaft 11 is also rotated about the center axis C by a mechanism unit (not shown). A socket holder 12 is attached to a tip end of the output shaft 11.

As can be seen from FIG. 1, a socket 5 to be retained by the socket holder 12 is relatively long. The socket 5 shown in FIG. 1 comprises a first tube portion 5a and a second tube portion 5b which has a larger diameter than that of the first tube portion 5a and which is coaxially connected to the first tube portion 5a. A recess having a shape corresponding to the shape of, for example, a nut to be fastened is formed in the tip end surface of the second tube portion 5b. Thus, a plurality of sockets 5 having different recesses which have shapes corresponding to different nuts to be fastened, are prepared.

In the plurality of sockets 5, the tip ends of the first tube portions 5a have the same shape so as to be retained by a single socket holder 12. Each socket 5 is retained by the socket holder 12 so as to be coaxial with the center axis C of the nut runner 10. Note that sockets 5 in which there is no difference between the first tube portion 5a and the second tube portion 5b can be included in the scope of the present invention.

Figure 2:
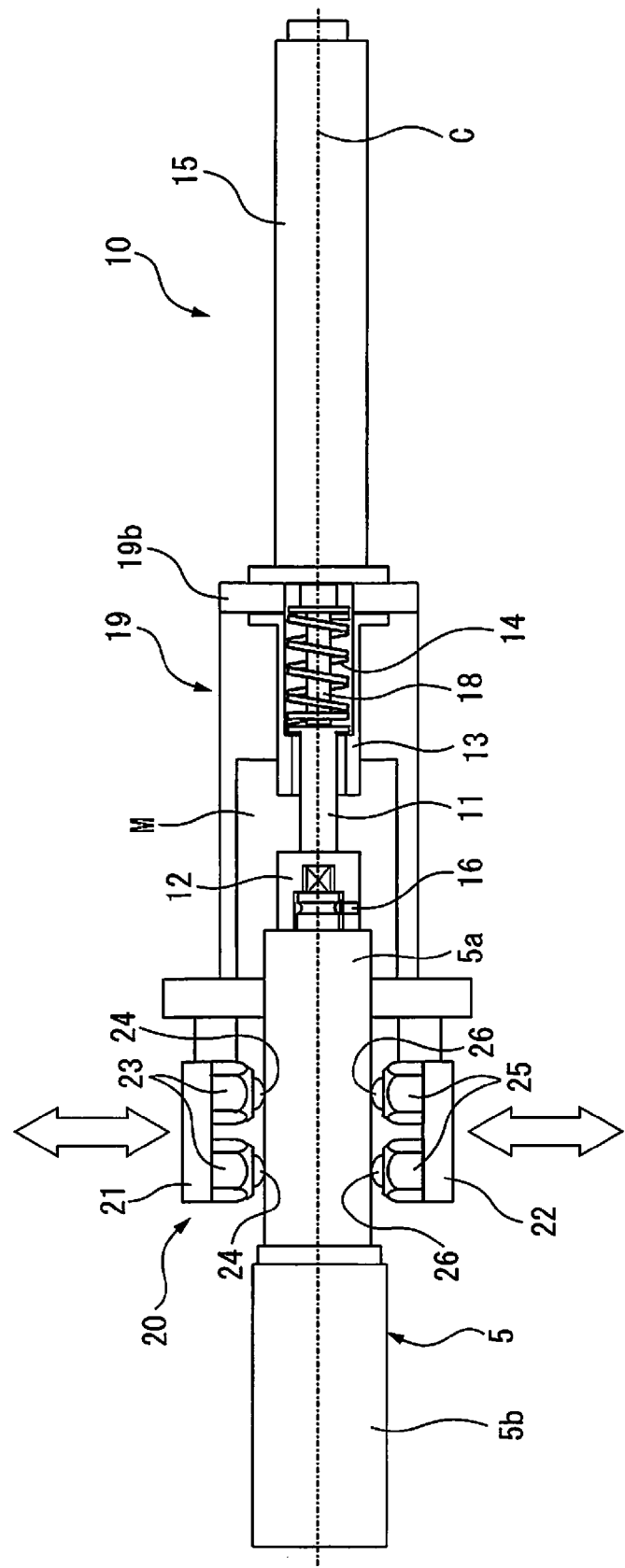
FIG. 2 is an axial sectional view of the nut runner shown in FIG. 1.

FIG. 2 is an axial sectional view of the nut runner shown in FIG. 1. As shown in FIG. 2, the tip end of the rod 18 engaged in the nut runner driving unit 15 is engaged with the rear end of the output shaft 11. A spring 14 is attached to the rear end of the output shaft 11. The spring 14 functions as a pushing unit for pushing the output shaft 11 in the axial direction, during a screw tightening operation, in cooperation with the slide mechanism unit 12.

Further, as can be seen from FIG. 2, at least one ball plunger 16 is provided in the peripheral surface of the socket holder 12. When the tip end of the socket 5 is inserted to the socket holder 12, the ball plunger 16 is engaged in an annular recess of the tip end of the socket 5 so that the socket 5 is retained.

After the socket 5 is retained in such a manner, the arm of the robot 1 moves to position the nut runner 10 at a desired position. Further, the spring 14 pushes the output shaft 11 toward the tip end in the axial direction, and thus, the recess in the tip end surface of the second tube portion 5b of the socket 5 engages with, for example, a nut to be fastened. After that, the nut runner 10 rotates about the center axis C while the output shaft 11 moves in the axial direction, and thus, the nut can be fastened or loosened.

Typically, the socket 5 is relatively long, and accordingly, the socket 5 retained in the socket holder 12 often inclines with respect to the center axis C of the nut runner 10. In other words, core runout of the socket 5 retained in the socket holder 12 often occurs.

Thus, in the present invention, a support unit 20 for supporting the first tube portion 5a of the socket 5 is provided. As shown in FIG. 1, the support unit 20 is connected to a driving unit attached to the bracket 19. In the description below, the support unit 20 supports the first tube portion 5a of the socket 5. However, the support unit 20 may support the second tube portion 5b of the socket 5.

Further, as can be seen from FIGS. 1 and 2, the support unit 20 has a first opening and closing claw 21 and a second opening and closing claw 22, which are opposed to each other. The claws 21 and 22 are open or closed by a driving unit, for example, a servomotor or air cylinder M attached to the bracket.

FIG. 2 shows two nuts 23 disposed on the inner surface of the first claw 21 and ball rollers 24 rotatably disposed in the nuts 23. The two ball rollers 24 are successively arranged along a line parallel to the center axis C. FIG. 2 also shows two nuts 25 disposed on the inner surface of the second claw 22 and ball rollers 26 rotatably disposed in the nuts 25. The two ball rollers 26 are successively arranged along a line parallel to the center axis C.

As can be seen from FIG. 2, when the first claw 21 and the second claw 22 of the support unit 20 are closed, the peripheral surface of the first tube portion 5a is sandwiched by the claws, and thus, the first tube portion 5a is supported. The nut runner 10 according to the present invention is provided with the support unit 20 as described above, and accordingly, even when the nut runner 10 is used horizontally, the socket 5 is not affected by gravity. Thus, core runout of the socket 5 can be prevented.

Further, the support unit 20 is provided with the ball rollers 24 and 26, and accordingly, the socket 5 can smoothly rotate about the center axis C and can smoothly slide in the axial direction. Thus, the socket 5 can be easily positioned. Further, the socket 5 can be easily replaced by opening the claws 21 and 22. Therefore, maintenance can be improved in the present invention.

As a matter of course, three or more ball rollers 24 and 26 and related nuts 23 and 25 may be arranged along lines parallel to the center axis C. In such a case, a core runout of the socket 5 will be prevented more effectively. Even when a single claw which supports the socket 5 from the bottom side is provided with only one ball roller, a core runout of the socket 5 will be prevented in a similar manner.

Figure 3A:
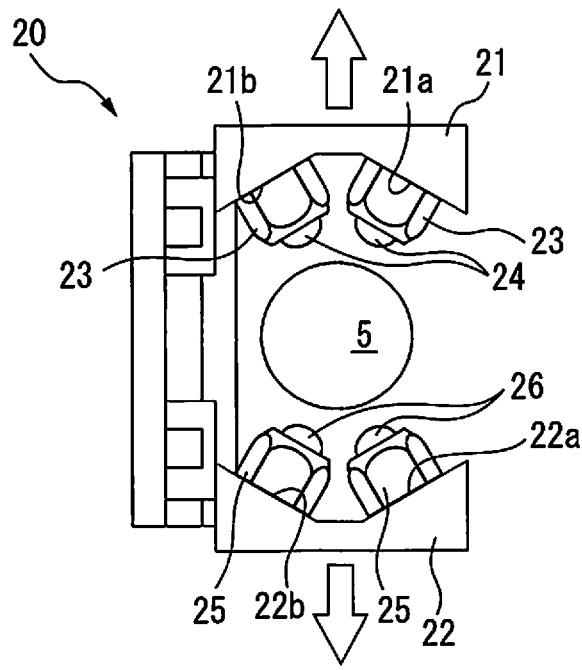
FIG. 3A is a first sectional view of opening and closing claws perpendicular to the center axis of a nut runner.
Figure 3B:
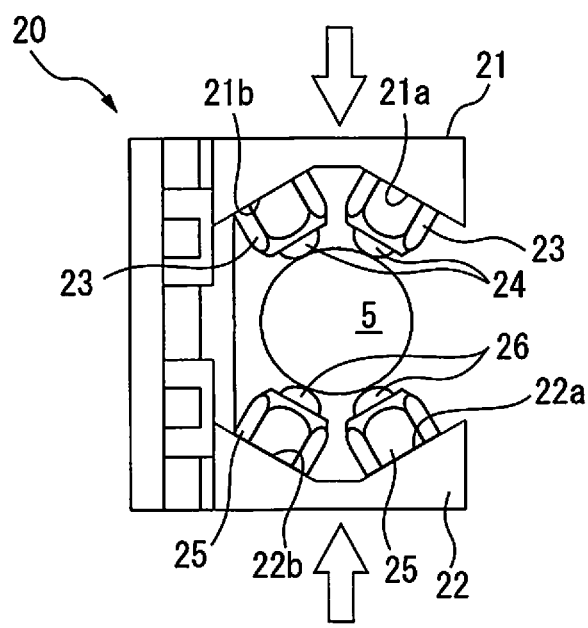
FIG. 3B is a second sectional view of opening and closing claws perpendicular to the center axis of a nut runner.

FIGS. 3A and 3B are sectional views of opening and closing claws perpendicular to the axis of a nut runner. FIG. 3A shows that the first claw 21 and the second claw 22 are open. FIG. 3B shows that the first claw 21 and the second claw 22 are closed.

As shown in FIGS. 3A and 3B, the inner surface of the first claw 21 is comprised of two inclined surfaces 21a and 21b which define a substantially V-shaped portion. Likewise, the inner surface of the second claw 22 is comprised of two inclined surfaces 22a and 22b which define a substantially V-shaped portion. As a matter of course, the inner surfaces of the claws 21 and 22 may be flat or may have a reverse V-shaped portion.

Further, as can be seen from FIGS. 3A and 3B, a pair of the nut 23 and ball roller 24 is provided on the respective inclined surfaces 21a and 21b of the first claw 21. Likewise, a pair of the nut 25 and ball roller 26 is provided on the respective inclined surfaces 22a and 22b of the second claw 22.

As can be seen from FIGS. 2 and 3A, each of the first claw 21 and the second claw 22 have four ball rollers. Accordingly, in the illustrated embodiment, each inclined surface has two ball rollers. Note that each inclined surface should have at least two ball rollers.

First, as shown in FIG. 3A, the first claw 21 and the second claw 22 are open, and the socket 5 is disposed therebetween. Secondly, as shown in FIG. 3B, the first claw 21 and the second claw 22 are closed to sandwich and support the socket 5.

As described above, the claws 21 and 22 have a substantially V-shaped inner surface. Accordingly, the socket 5 is pressed by four ball rollers 24 and 26 in four directions. Thus, in the present invention, the socket 5 can be reliably grasped between the two claws. Note that flat or reverse V-shaped inner surfaces of the first claw 21 and the second claw 22 are included in the scope of the present invention.

EFFECT OF THE INVENTION

In the first aspect, a support unit for supporting a relatively long socket is provided. Thus, when a nut runner is used horizontally, the socket is not affected by gravity. Therefore, core runout can be prevented, and the socket can be easily positioned.

In the second aspect, ball rollers are used, so that the socket can be easily positioned, rotated, and slid. Further, the socket can be easily replaced, and the maintenance performance can be improved by opening claws.

In the third aspect, the socket can be reliably grasped between the claws.

The invention claimed is:

1. A nut runner, comprising:
an output shaft configured to be rotatable about a center axis of the nut runner, the output shaft including a first end and a second end;
a socket holder attached to the first end of the output shaft, the socket holder being configured to retain a socket, so that the output shaft, the socket holder and the socket are rotatable about and movable along the center axis together;
a slide mechanism in which the second end of the output shaft is slidable along the center axis;
a pusher housed in the slide mechanism, the pusher being engaged with the second end of the output shaft and configured to push the output shaft toward the socket holder along the center axis, during a screw tightening operation, in cooperation with the slide mechanism; and
a support configured to support the socket retained by the socket holder while allowing the socket to rotate about and axially move along the center axis, wherein
the support comprises two opening and closing claws opposed to each other and ball rollers rotatably attached to the respective claws; and
the support supports the socket by closing the claws so that the ball rollers of the respective claws abut an outer peripheral surface of the socket.

2. The nut runner according to claim 1, wherein a cross section of each of the claws, taken along a line perpendicular to the center axis of the nut runner, has a substantially V-shaped portion.

3. The nut runner according to claim 1, further comprising:
- a bracket that supports the slide mechanism; and
- a motor attached to the bracket, wherein the motor is configured to open and close the claws of the support, wherein the support is connected to the motor.

4. A nut runner, comprising:
- an output shaft configured to be rotatable about a center axis of the nut runner, the output shaft including a first end and a second end;
- a socket holder attached to the first end of the output shaft, the socket holder being configured to retain a socket, so that the output shaft, the socket holder and the socket are rotatable about and movable along the center axis together;
- a slide mechanism in which the second end of the output shaft is slidable along the center axis;
- a pusher housed in the slide mechanism, the pusher being engaged with the second end of the output shaft and configured to push the output shaft toward the socket holder along the center axis, during a screw tightening operation, in cooperation with the slide mechanism; and
- a support configured to support the socket retained by the socket holder while allowing the socket to rotate about and axially move along the center axis, wherein
- the support comprises at least two ball rollers successively arranged along a line parallel to the center axis.

5. The nut runner according to claim 1, wherein
the support supports the socket at a first portion of the socket,
the socket has a second portion retained by the socket holder, and
the first portion is distanced from the second portion along the center axis.

* * * * *